(12) United States Patent
Nirhamo

(10) Patent No.: US 8,219,309 B2
(45) Date of Patent: Jul. 10, 2012

(54) METHOD AND APPARATUS FOR A NAVIGATIONAL GRAPHICAL USER INTERFACE

(75) Inventor: Mikko Nirhamo, Berlin (DE)

(73) Assignee: Nokia Corporation, Espoo (FI)

( * ) Notice: Subject to any disclaimer, the term of this patent is extended or adjusted under 35 U.S.C. 154(b) by 274 days.

(21) Appl. No.: 12/474,442

(22) Filed: May 29, 2009

(65) Prior Publication Data

US 2010/0305849 A1 Dec. 2, 2010

(51) Int. Cl.
*G01C 21/00* (2006.01)
(52) U.S. Cl. .......................................................... 701/206
(58) Field of Classification Search .................... 701/206
See application file for complete search history.

(56) References Cited

U.S. PATENT DOCUMENTS

| | | | |
|---|---|---|---|
| 6,067,502 A | 5/2000 | Hayashida et al. | |
| 6,121,900 A | 9/2000 | Takishita | |
| 6,202,026 B1 | 3/2001 | Nimura et al. | |
| 6,842,122 B1 | 1/2005 | Langner et al. | |
| 7,212,216 B2 | 5/2007 | He et al. | |
| 7,274,311 B1* | 9/2007 | MacLeod | 340/995.13 |
| 2007/0005233 A1 | 1/2007 | Pinkus et al. | |
| 2008/0040024 A1 | 2/2008 | Silva | |
| 2008/0065322 A1 | 3/2008 | Ng et al. | |
| 2010/0169003 A1* | 7/2010 | Van Der Meer | 701/207 |

FOREIGN PATENT DOCUMENTS

| | | |
|---|---|---|
| JP | 10-340045 | 12/1998 |
| JP | 11-287661 | 10/1999 |
| JP | 2000-3497 A | 1/2000 |
| JP | 2001-50764 A | 2/2001 |
| JP | 2004-132789 A | 4/2004 |
| WO | WO 2009/002942 A2 | 12/2008 |

OTHER PUBLICATIONS

Zhang, M2S maps: supporting real-world navigation with mobile VR, Virtual Reality, 2007, 11:161-173, downloaded from ProQuestDirect on the Internet on Mar. 2, 2012, 14 pages.*
International search report and written opinion for corresponding international application No. PCT/IB2010/052402 dated Sep. 14, 2010, pp. 1-13.
UE3: UnrealEd Menubar. Unreal Wiki, Last Modified: Dec. 9, 2008, Accessed: Sep. 15, 2009, pp. 1-10, http://wiki.beyondunreal.com/UE3:UnrealEd_menubar.
International Preliminary Report on Patentability for PCT Application No. PCT/IB2010/052402 dated.Nov. 29, 2011, pp. 1-7.

* cited by examiner

*Primary Examiner* — James Zurita
(74) *Attorney, Agent, or Firm* — Ditthavong Mori & Steiner, P.C.

(57) ABSTRACT

An approach is provided for presenting a graphical user interface on a mobile device according to a navigational application. A presentation is initiated of a graphical user interface on a mobile device according to a navigational application. The graphical user interface includes a first area displaying one or more selectable objects. The graphical user interface also includes a second area displaying a map in perspective view that preserves a predetermined form. The first area and the second area are non-overlapping.

20 Claims, 12 Drawing Sheets

METHOD AND APPARATUS FOR A NAVIGATIONAL GRAPHICAL USER INTERFACE

BACKGROUND

Navigation systems and services have been widely deployed in both commercial and consumer sectors, as a standalone service or a service integrated with telecommunication services. Service providers and device manufacturers are continually challenged to deliver value and convenience to consumers by, for example, providing compelling network services, applications, and content as well as user-friendly devices. An important differentiator in this industry relates to the user interface, which is particularly significant in cases where the display size is constrained (e.g., in a cellular phone, small portable navigation units, etc.). Traditionally, navigational graphical user interfaces have been cumbersome in terms of user interaction and difficult to view on a small navigational screen.

SOME EXAMPLE EMBODIMENTS

According to one embodiment, a method comprises initiating presentation of a graphical user interface on a mobile device according to a navigational application. The graphical user interface includes a first area displaying one or more selectable objects. The graphical user interface also includes a second area displaying a map in perspective view that preserves a predetermined form. The first area and the second area are non-overlapping.

According to another embodiment, an apparatus comprising at least one processor, and at least one memory including computer program code, the at least one memory and the computer program code configured to, with the at least one processor, cause the apparatus to initiate presentation of a graphical user interface on a mobile device according to a navigational application. The graphical user interface includes a first area displaying one or more selectable objects. The graphical user interface also includes a second area displaying a map in perspective view that preserves a predetermined form. The first area and the second area are non-overlapping.

According to another embodiment, a computer-readable storage medium carrying one or more sequences of one or more instructions which, when executed by one or more processors, cause an apparatus to initiate presentation of a graphical user interface on a mobile device according to a navigational application. The graphical user interface includes a first area displaying one or more selectable objects. The graphical user interface also includes a second area displaying a map in perspective view that preserves a predetermined form. The first area and the second area are non-overlapping.

According to yet another embodiment, an apparatus comprises means for initiating presentation of a graphical user interface on a mobile device according to a navigational application. The graphical user interface includes a first area displaying one or more selectable objects. The graphical user interface also includes a second area displaying a map in perspective view that preserves a predetermined form. The first area and the second area are non-overlapping.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENT

A method, apparatus, and software for a graphical user interface (GUI) that displays navigational information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to mobile devices capable of supporting both navigational and communication applications, it is contemplated that the approach described herein may be used with other devices (e.g., desktop computers, laptops, etc.) and standalone navigational applications.

Figure 1:
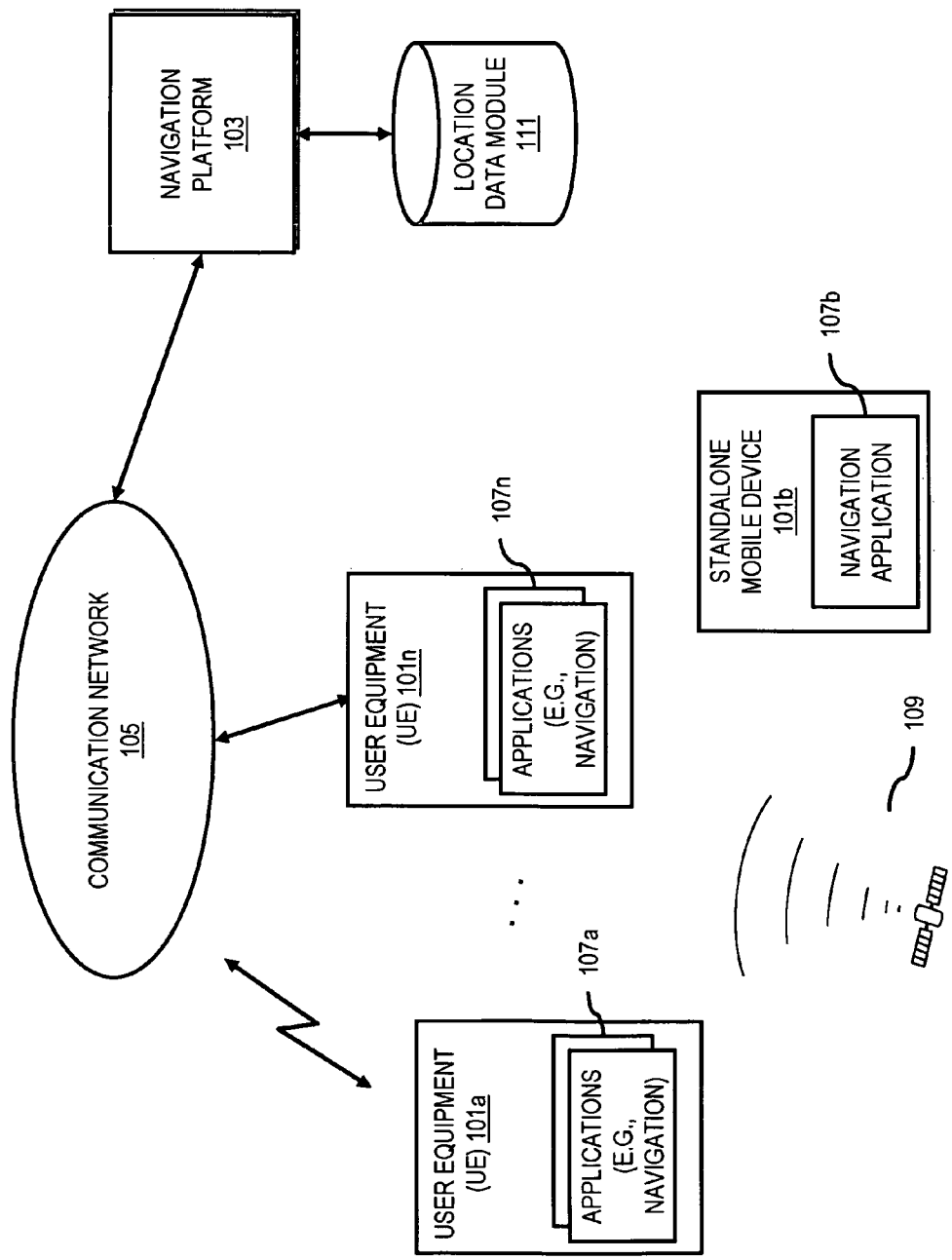
FIG. 1 is a diagram of a system including user equipment capable of displaying a navigational graphical user interface, according to one embodiment.

FIG. 1 is a diagram of a system including user equipment capable of displaying a navigational graphical user interface, according to one embodiment. As noted, navigational services have gain ubiquitous adoption by users, but that the conventional interfaces can be rather burdensome. Such interfaces can lack an intuitive interface for inputting information and viewing information. In recognition of this, system 100 is configured to provide navigational services that include a GUI that offers features that are easy to operate and view. Thus, the system 100 provides a user the ability to fully utilize the navigational services offered by a service provider. However, it is difficult to create a navigational GUI that is robust enough to provide users adequate services, simple enough for users to easily utilize the features, and sized to allow a user comfortable viewing of the GUI. Generally, the more robust the features of an application, the more convoluted the interface.

To address this problem, system 100 of FIG. 1 introduces user equipment (UE) with the capability to display a navigational GUI that is easily utilized, utilizes the viewable screen area of the UE 101, and provide a robust set of features. In certain embodiments, the graphical user interface displays navigational information in a manner that includes at least two layers of a display, and provides an approach to select an object in one layer and interact with an object in a second layer.

The UE 101 can be any type of mobile terminal, fixed terminal, or portable terminal including a mobile handset, station, unit, device, multimedia tablet, Internet node, communicator, desktop computer, laptop computer, Personal Digital Assistants (PDAs), cellular device, an embedded vehicle device, or any combination thereof. An embedded vehicle device can include a device that is integrated with the car (e.g., controls on a steering wheel), or fixed either temporarily or permanently to a car (e.g., a location device set on the dashboard). It is also contemplated that the UE 101 can support any type of interface to the user (such as "wearable" circuitry, etc.). The UE 101 can be used by a user to acquire location data from a navigation platform 103 via a communication network 105. Some mobile devices (e.g., device 101b) may not be connected to a communication network 105, and thus, is a standalone mobile device that specializes in providing a navigation application. The UE 101 may use an application 107, such as a navigational application 107a-107n, to convey navigation services to a user. In some embodiments, the UE 101 can use a tracking mechanism to obtain location data regarding the UE 101. In one embodiment, the UEs 101 gather information from global positioning system (GPS) satellites 109 to determine the location of the UE 101. In other embodiments, the UE 101 can use another tracking mechanism, such as Assisted GPS (A-GPS), a cell of origin system, or other location tracking system. A navigation platform 103 can be used in conjunction with a location data module 111 to update locations of points of interest (POI), landmarks, and other dynamically moving targets (e.g., a friend with location tracking enabled).

According to one embodiment, a user of a UE 101 starts a navigation application 107 via a GUI. The view areas of a display (e.g., touch screen) can be referred to as layers, wherein each of the layers is associated with a defined area, which when activated can prompt the user to select a view of, for example, two layers—i.e., a first area and a second area. By way of example, the user can begin with a map view of the user's current position displayed on a screen. In one embodiment, by touching the screen, an interactive menu can be enabled and the original two-dimensional (2D) map view can be tilted into a three-dimensional (3D) map view. The interactive menu can be used to select objects on the 3D map. Objects on the 3D map can be updated via a navigation platform 103 with access to a location data module 111. The location data module 111 can keep track of moving POIs (e.g., friends), as well as temporary POIs (e.g., road block), permanent POIs (e.g., landmarks), as well as traffic information and other route calculation information. The interactive menu can be used to activate options pertaining to objects of interest (e.g., call a friend on the map, see restaurant object's menu). To navigate away from the interactive menu and return to the 2D map view, the user may either click on the map section of a touch-screen device or click on a return button on a device that does not use a touch-screen.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, mobile ad-hoc network (MANET), and the like.

In this example, the UE 101 and the navigation platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
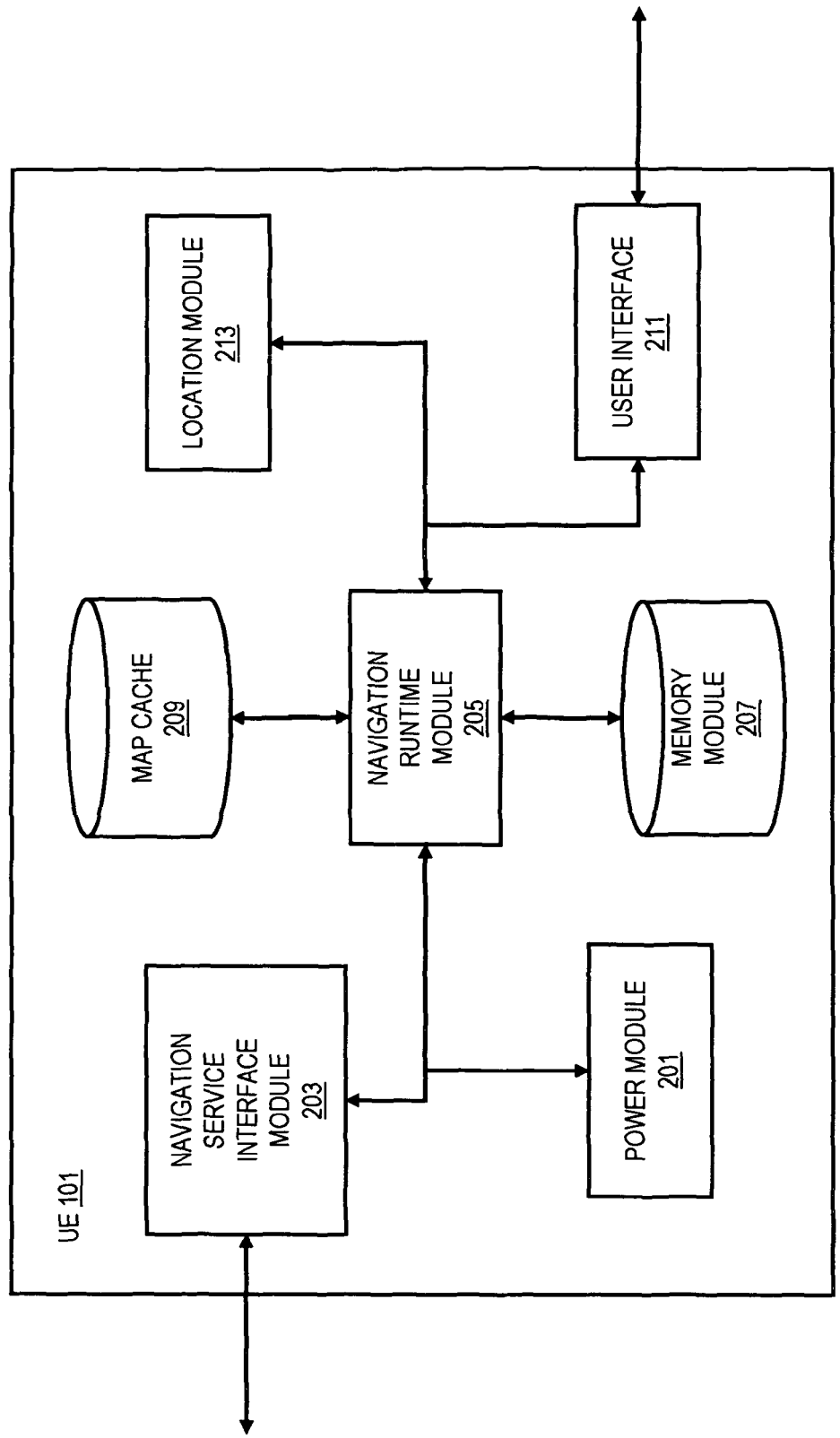
FIG. 2 is a diagram of the components of user equipment that can display a navigational graphic user interface, according to one embodiment.

FIG. 2 is a diagram of the components of a UE 101 that can display a navigational graphic user interface, according to one embodiment. By way of example, the UE 101 includes one or more components for displaying an improved navigational GUI. It is contemplated that the functions of these components may be combined in one or more components or performed by other components of equivalent functionality. In this embodiment, the UE 101 includes a power module 201, a navigation service interface module 203, a navigation runtime module 205, a memory module 207, a map cache module 209, a user interface 211, and a location module 213.

The power module 201 provides power to the UE 101. The power module 201 can include any type of power source (e.g., battery, plug-in, etc.). Additionally, the power module 201 can provide power to the components of the UE 101 including processors, memory, and transmitters.

In one embodiment, the UE 101 includes a navigation service interface module 203. The navigation service interface module 203 is utilized by a navigation runtime module 205 to request navigation services from a navigation platform 103. These services can include POI location information, POI temporary location information, dynamic map information, advertising information, friend location information, and other navigational or map information. The navigation runtime module 205 can utilize these services by storing communications information in a memory module 207. Data (e.g., navigational data or map data) from the navigation platform 103 can be downloaded and stored in a map cache 209. The map cache 209 can be updated periodically by downloading updates. Thus, the UE 101 can store up-to-date information and thus take less network resources and power while utilizing the navigation platform 103. Map data can include typical road and terrain maps as well as indoor maps of buildings. In one embodiment, the map data includes the locations of friends of the user. The user's friends can be registered with a navigation service that tracks their location. The navigation platform 103 can provide the user access to the friend's location. In another embodiment, the map data includes restaurant data (e.g., location information of restaurants in the area that serve a particular cuisine, etc.). Further, in one or more embodiments, the user can change between a first area view that has road and terrain maps, and a second area view that has indoor maps of buildings (e.g., floor plans). Alternatively, the first area may include a map used for driving instructions, and the second area view may provide a map for a pedestrian or bicycle; in this manner, the user can switch therebetween. Such scenario can provide a seamless set of instructions for a user who first drives and then gets out of the car towards the destination on foot or bicycle.

In one embodiment, the UE 101 includes a location module 213. This location module 213 can determine the user's location. The user's location can be determined by a triangulation system such as GPS, assisted-GPS (A-GPS), Cell of Origin, or other location extrapolation technologies, as well as proximity location indicators, such as a signal from a wireless local area network (WLAN), a Bluetooth® system, or the like. Standard GPS and A-GPS systems can use satellites to pinpoint the location of a UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 213 may also utilize multiple technologies to detect the location of the UE 101. For instance, a GPS system may narrow the location of the UE 101 to a building and a WLAN signal can determine UE 101 locations within the building.

In one embodiment, the UE 101 includes a navigation runtime module 205 that can process a user's requests via a user interface 211 and run navigational applications 107. When the navigation application 107 is activated, the runtime module 205 can determine the location of the UE 101 using a location module 213. In this embodiment, the user can view a 2D or 3D map centered on the user's location. In a single click, the user can select to view a tilted 3D map view (or perspective view) along with an interaction list. The controls and menus on the map can be hidden. In one click the map turns from a top-view map to a tilted 3D map view with an interaction list. In the next click, the map can turn back to a top-view map. Having a partial screen 3D map view can save battery life by limiting the power needed to render the image on a full screen. The interaction list can be clearly prioritized for the interaction. This also allows for a single system to be implemented on multiple UEs 101 using different forms of controls (e.g., hard keys, touch-screen, a scroll, select, and back interface, etc.). Additionally, this allows the user to stay in a single state while providing different functions or content on top of the map layer. For example, using the interaction list, a user is able to add friend locations on to the map, each friend having interactive functions associated with the friend while selected. In the next instance, the user can select to add nearby restaurants to the map. In this manner, objects are added to the map without having to change the state of the map.

Figure 3:
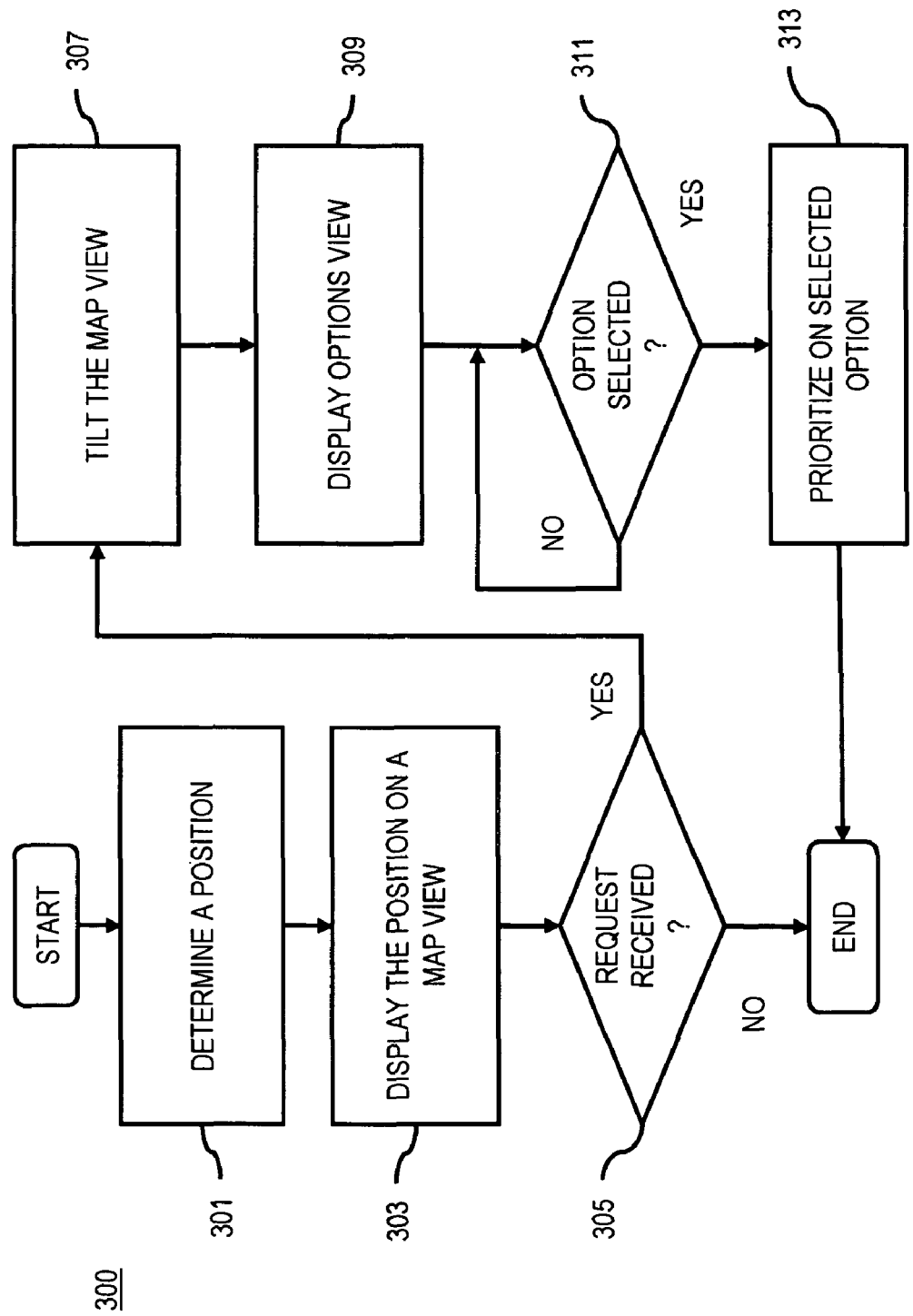
FIG. 3 is a flowchart of a process for displaying a navigational graphic user interface that utilizes a prioritization scheme, according to one embodiment.

FIG. 3 is a flowchart of a process for displaying a navigational graphic user interface that utilizes a prioritization scheme, according to one embodiment. In one embodiment, the runtime module 205 performs the process 300 and is implemented in, for instance, a chip set including a processor and a memory as shown FIG. 11. A user can activate a navigation application 107 using the navigation runtime module 205. In step 301, the navigation application 107 can determine the position of the UE 101 by querying a location module 213. At step 303, the user interface 211 displays the location of the UE 101 on a top-view map. The user is allowed to interact with the map by using a keypad or other input method.

At step 305, if the user interface 211 receives a request to utilize a list-menu, at step 307, the navigation runtime module 205 modifies the map view into a tilted perspective view utilizing an area of the interface screen. This allows for all of the information in the top-view map to be displayed while using less screen area. The list-menu can be displayed in the additional screen area. Additionally, advertisements and other information can be placed in this additional screen area.

At step 309, the user interface 211 displays an options view in the additional screen area. The options view can include selectable objects that can be viewed on the map display. In step 311, the process waits for an object to be selected. When an object is selected, at step 313, the list-menu is prioritized based on the object. Also, in certain embodiments, controls and menus on the map can be hidden, so such information does not disturb the interaction on the map. Furthermore, the list and map interact; for example, changing the item on the list or browsing items on the list can show the corresponding location on the map or, e.g., changes on the route.

In one embodiment, when, for example, a point-of-interest (e.g., restaurant) is selected, an advertisement or menu for the restaurant can be displayed. The advertisement can be associated with an object in the interface. In this manner, advertisements can be used as an alternative billing mechanism for using navigational services. In another embodiment, when a friend is selected, the map area can hide all information unrelated to friend data. In yet another embodiment, the user can select an option to display all of the points of interests that satisfy a certain criteria (e.g., pizza establishments) in the area. When the user selects this option, other information on the map that may distract the user can be hidden. The user can then select additional options related to the object (e.g., an option to call a pizza establishment, an option to order a pizza online, an option to make a pizza establishment a waypoint, etc.). Thus, the user can utilize multiple features of a navigation application while not distracted by a convoluted interface.

With the described interface, the user can readily return back to a "home" screen. In other words, the map, as presented, prevents the user from getting lost in the interaction. Furthermore, activating the list is also clear, in that the user need not be moved to another state (or screen), but the application remains in the same context. Such list, for example, can provide several different functions or content on top of the map layer.

With the above approach, users are offered a robust variety of navigational features on a device via an intuitive user interface. In this manner, the UE 101 can display options to a user where the option has an object associated with it. For example, this approach allows a user to search for a pizza establishment, select the pizza establishment to route a course to it, and call the establishment to order a pizza before arriving at the location. Additionally, the user can view the pizza establishment as an object in a map area while selecting in a selection area. With such an intuitive user interface, the mobile device can reduce power consumption in that users need not have to continue traversing a maze of menus to execute certain desired instructions.

Figure 4:
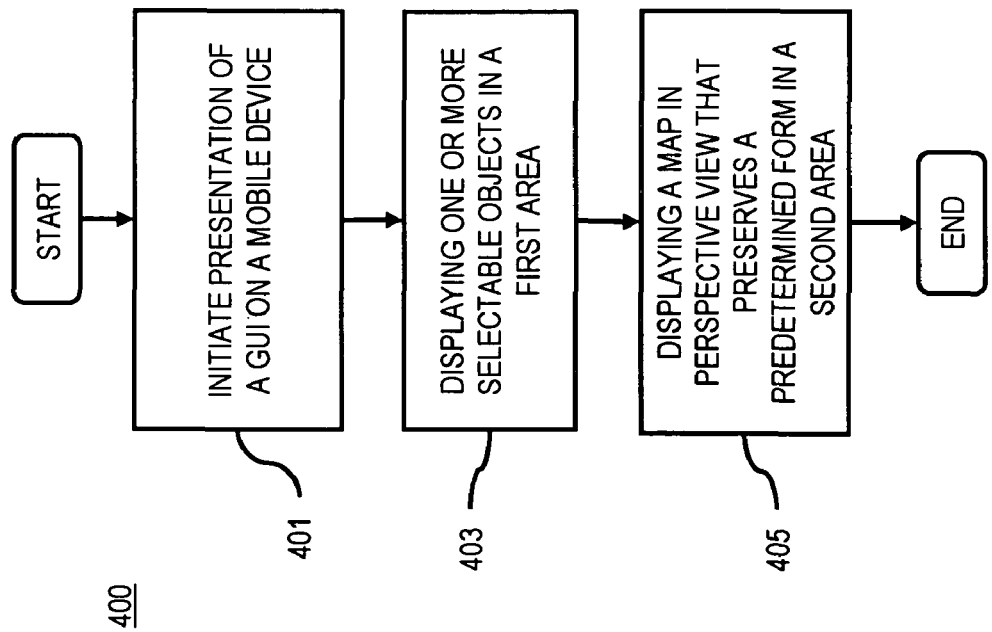
FIG. 4 is a flowchart of a process for displaying a navigational graphic user interface that provides a perspective view of a map in conjunction with selectable objects, according to one embodiment.

FIG. 4 is a flowchart of a process for displaying a navigational graphic user interface that provides a perspective view of a map in conjunction with selectable objects, according to one embodiment. In one embodiment, the navigation runtime module 205 performs the process 300 and is implemented in, for instance, a chip set including a processor and a memory as shown FIG. 11. The navigation runtime module 205 begins execution of the navigation application 107. The navigation runtime module 205 can query the location of the user using a location module 213. The location of the user can be displayed on a top-view map. At step 401 the navigation runtime module 205 initiates the presentation of a graphical user interface on a mobile device.

Presenting the graphical user interface includes, at step 403, displaying one or more selectable objects in a first area. At step 405, presenting the graphical user interface includes displaying a map in perspective view that preserves a predetermined form or shape; in one embodiment, this can include maintaining scaling information. Preservation of the form, in one embodiment, means that the information is preserved. In one embodiment, the first area and the second area are non-overlapping. The selectable objects in the first area can be associated with objects in the second area. In some embodiments, selecting an object initiates a modified image of the map. An object can be activated by using a button, a touch screen, or a scroll and click mechanism associated with the first area. In one embodiment, a selectable object relates to a point-of-interest or a waypoint. In this embodiment, selecting an object waypoint causes the navigation runtime module 205 to determine a route from the current location to the waypoint. The route is then displayed on the map. The waypoint associated may also be shown on the map. Additionally, points-of-interest related to the waypoint can also be displayed on the map. For example, in one embodiment, landmarks representing turns on the route can be identified and displayed (e.g., turn left at restaurant A, turn right at landmark B). In some embodiments, each interactive step occurs within the first area, making the interaction simpler for a user to follow.

With the above approach, users can take advantage of the features available in a navigation system via a GUI. In this manner, the user can select an object in the first area and graphically view the selection in a second area having a perspective map view. For example, this approach allows for an approach to route a user via landmark directions instead of traditional street directions. This is important in areas where street signs are not visible, do not exist, or if the user prefers landmark directions. Advantageously, users are offered a robust variety of navigational features on a device via an intuitive user interface, thereby resulting in an enhance user experience and reducing power consumption because of the efficiency.

Figure 5:
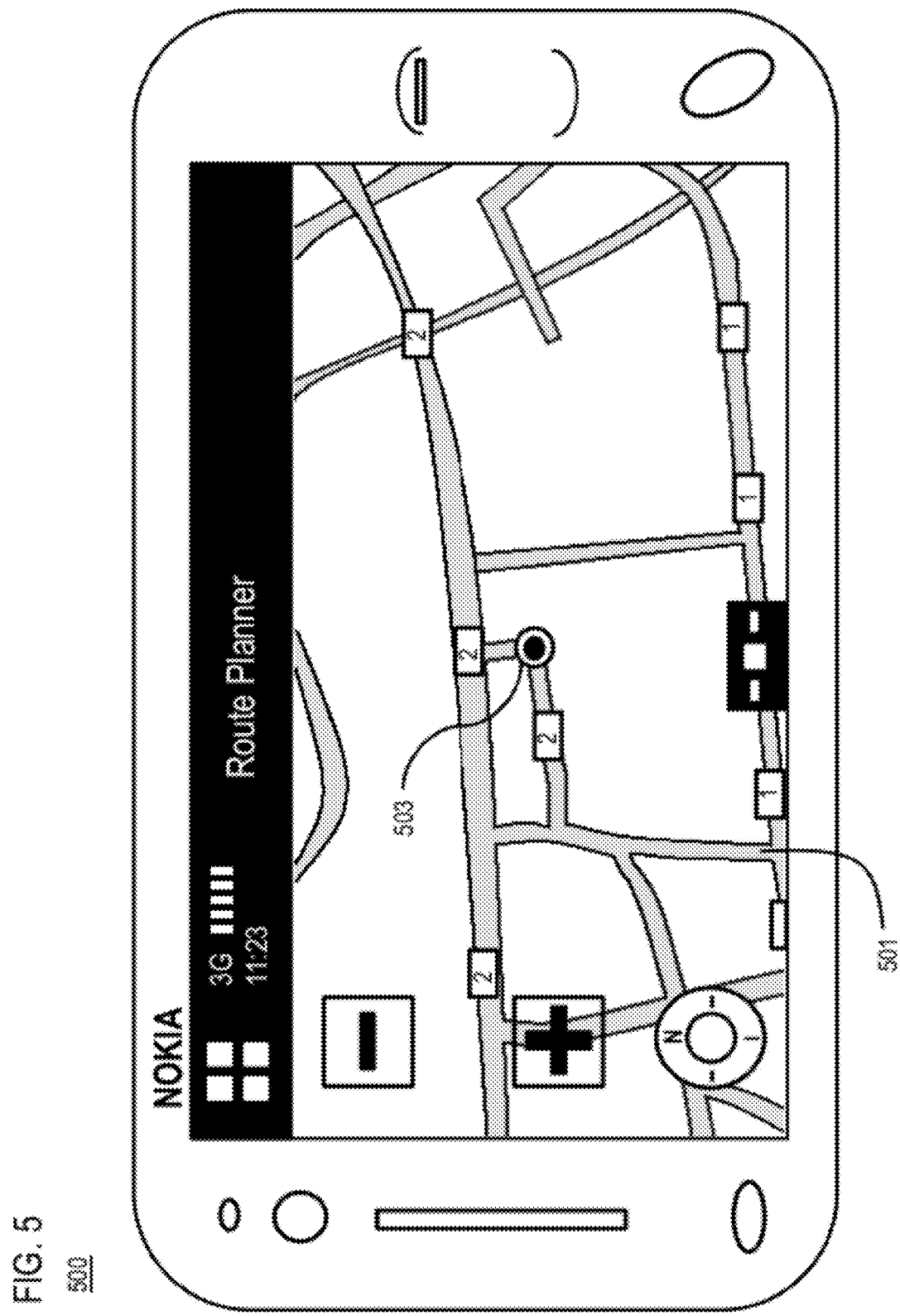
FIGS. 5-9 are diagrams of user interfaces utilized in the processes of FIG. 3, according to various embodiments.

FIG. 5 is a diagram of a user interface utilized in the processes of FIG. 3, according to one embodiment. In one embodiment, a first area and a second area (corresponding to different application layers) of a GUI can be arranged such that at least one predefined area of the first application provides access to the second layer. The first layer can be a map view, while the second layer provides a waypoint list; the first layer can be put into the "background" as appropriate. Under this scenario, the user interface 500 displays a top-view map 501. The top-view map currently displays the location of the user 503 while in a city map style. The top-view map can also display routes from the current position 503 to a destination waypoint (not shown).

Figure 6:
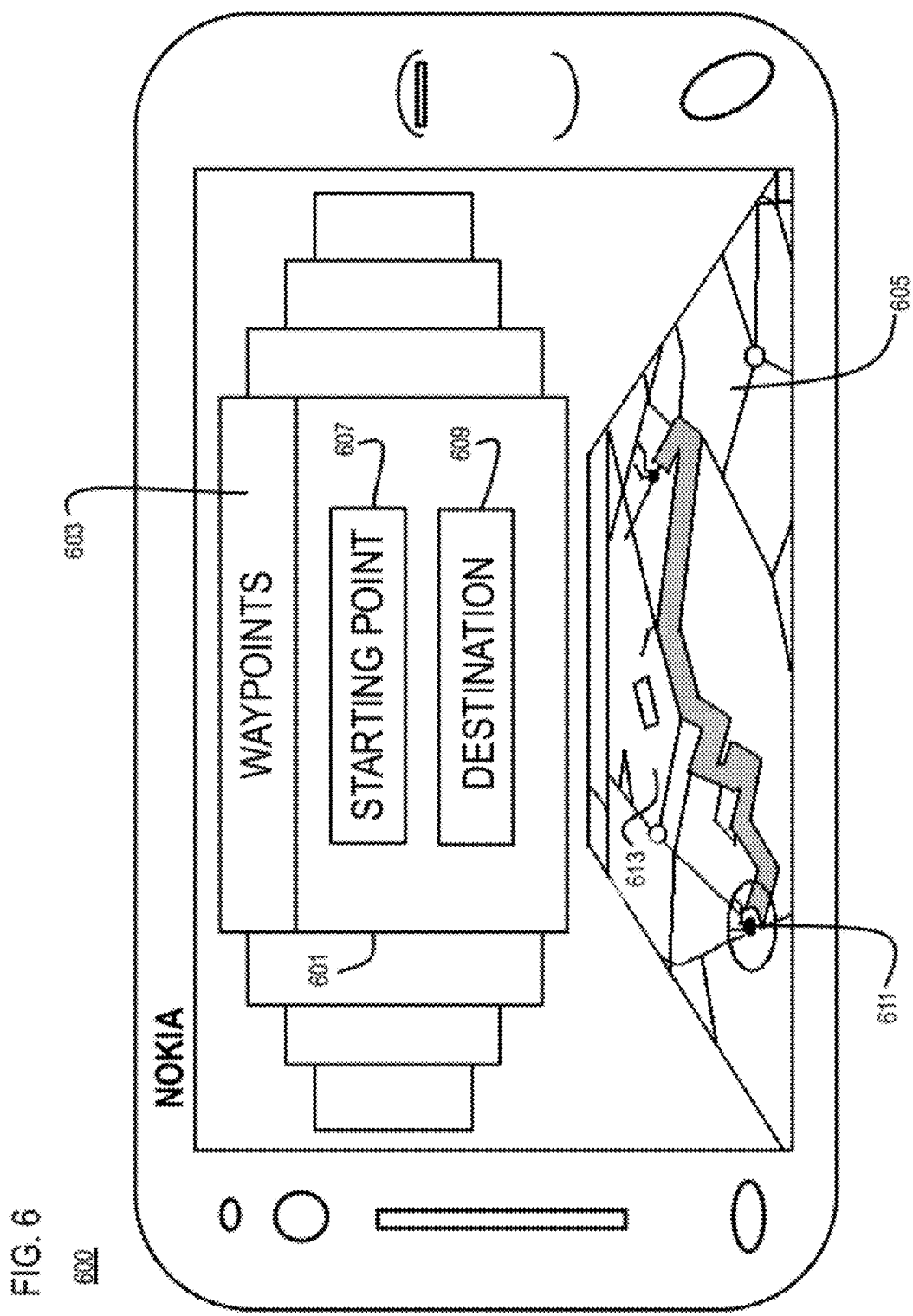

FIG. 6 is a diagram of a user interface utilized in the processes of FIG. 3, according to one embodiment. The user interface 600 displays two areas. In the first area 601 includes a list 603 of selectable objects. The second area 605 includes a 2D map in perspective view. In the first area 601, the user can select from two waypoints, a starting point 607 and a destination 609. The first area 601 can be represented in many ways (e.g., carousel list, horizontal list, vertical list, icons, grid, etc.). Selecting (e.g., clicking on) an item in the first area 601 can highlight a corresponding item in the second area 605. In one embodiment, when the starting point 607 is selected, the second area 605 centers to a starting point object 611 on the map that corresponds to the starting point 607. When the destination 609 is selected, the map can center on a destination object 613 that corresponds to the destination waypoint. Selectable objects can also be opened to show more options regarding the objects. For example, selecting the destination 609 can open an option list (not shown) including options to select routes to the destination, as well as destination options (e.g., call destination, view destination history). The user can return to a top-map view 500 by clicking on the second area 605 map. In one embodiment, the user activates a search in the first area 601. The search can display the results in the first area, where the user can browse items in the results list. The corresponding item is shown on the map.

Figures 7A, 7B:
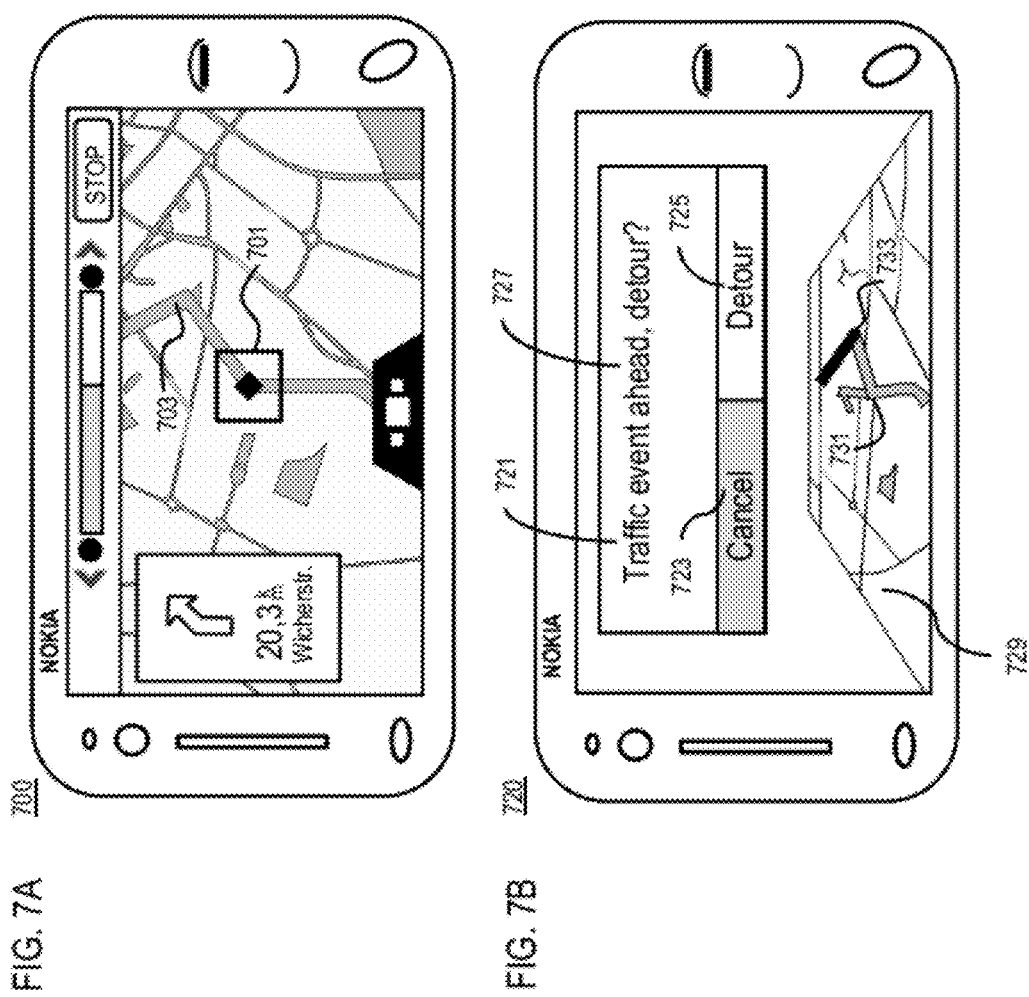

FIGS. 7A and 7B are diagrams of user interfaces utilized in the processes of FIG. 3, according to one embodiment. In this embodiment, user interface 700 displays a top-view map centered on the user's location 701. The map also displays a route 703 the user is following to a destination (not shown). User interface 720 displays traffic event 721 selection triggered by the navigation application 107 to notify the user of a traffic event 721 along the current route. The navigation application 107 allows the user to choose to follow current route 723, or to detour 725. In one embodiment, the corresponding routes to the selection interface 727 are shown in a perspective map area 729. The route objects 731, 733 can be color coded, shaded, or otherwise grouped to correspond to the selection options 723, 725. Here, the user can select option to detour 725 from the current route 733 to a detour route 731 that has less traffic. In one embodiment, when the detour option is selected, the selection interface 727 can display directions (not shown) to a destination along the detour path. In this manner, route specific selections can be made in the selection interface 727.

Figure 8:
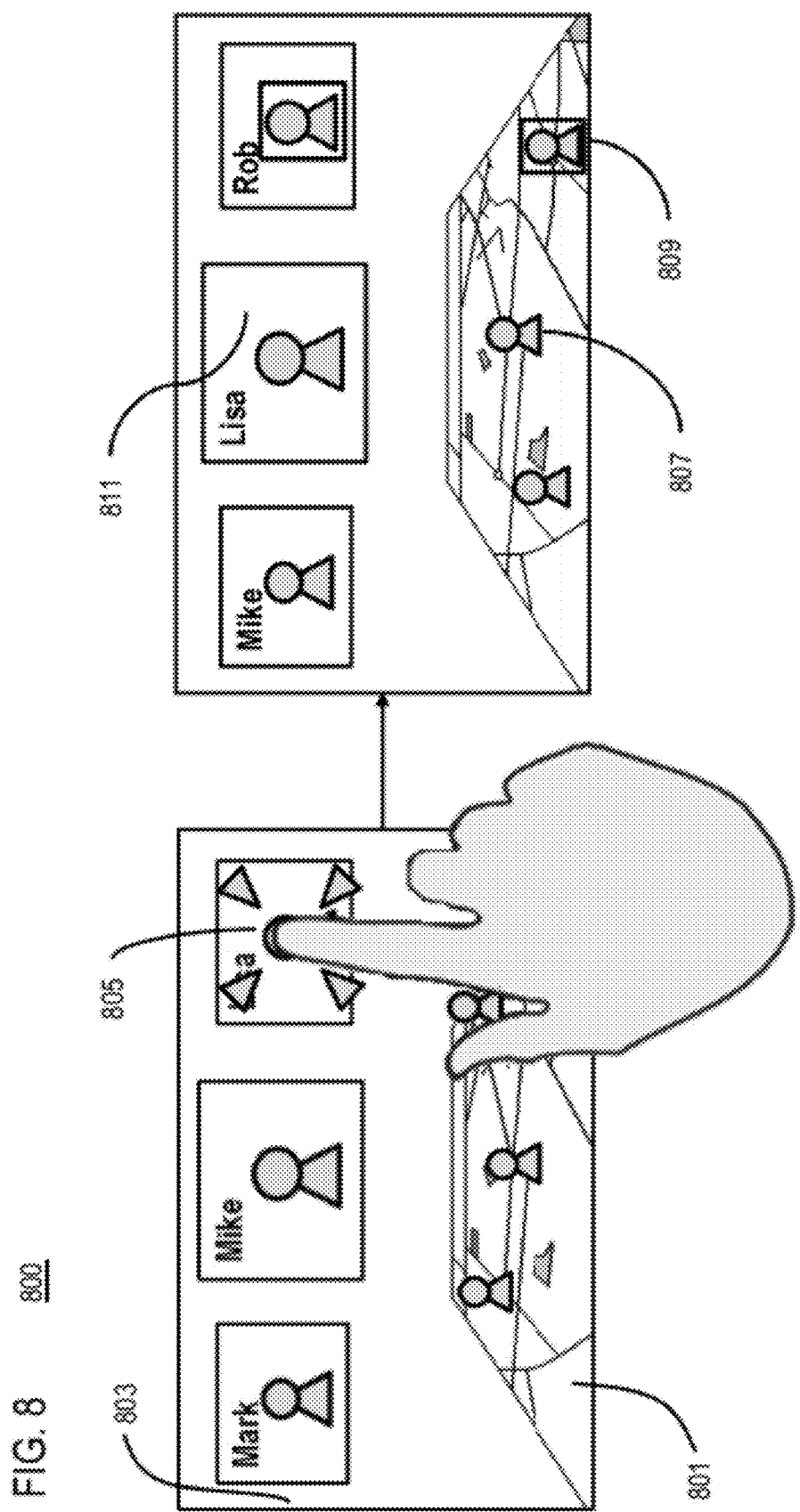

FIG. 8 is a diagram of a user interface utilized in the processes of FIG. 3, according to one embodiment. In this embodiment, user interface 800 displays the location of a user's friends within a map area 801. The user is able to select friends via a selection area 803. When the user selects a friend, Lisa 805, the map area 801 centers around a Lisa object 807. When the centering occurs, a new related friend object, a Rob object 809 appears. The Rob object 809 can now be selected via the selection area 803. Additionally, by selecting the centered-on Lisa option 811, the user is able to choose from a menu of Lisa-related options (not shown). These options can include calling, texting, messaging, or using Lisa as a waypoint.

Figure 9:
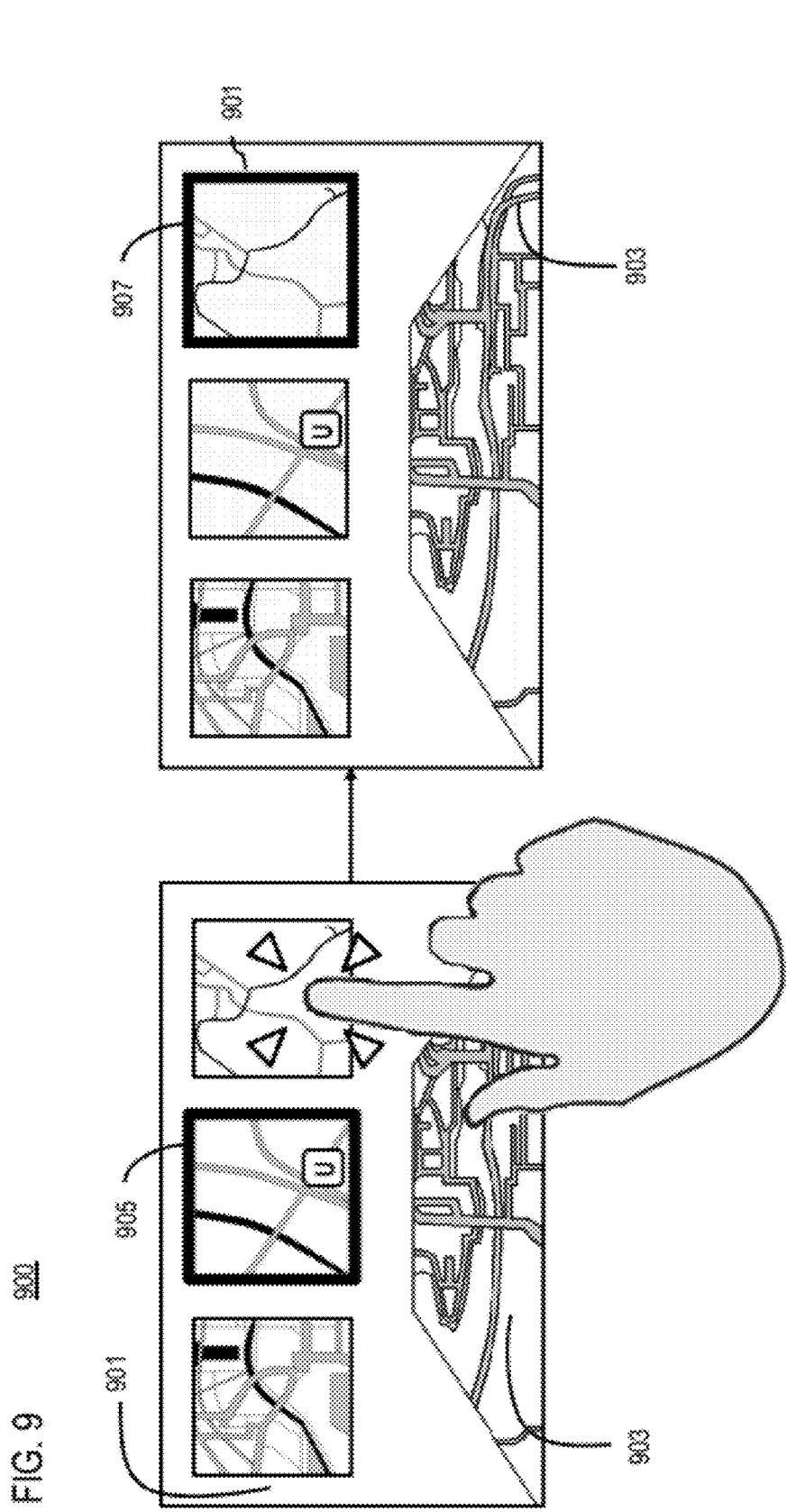

FIG. 9 is a diagram of a user interface utilized in the processes of FIG. 3, according to one embodiment. In this embodiment, user interface 900 displays map options in a first area 901. The user interface 900 displays a perspective-view map in a second area 903. The user is able to select the type of map displayed in the second area 903 by using a selection menu in the first area. In one embodiment, the user can select a terrain view 905. In another embodiment, the user can select a city view 907. The map in the second area 903 changes corresponding to the selected option.

The processes described herein for providing a navigational graphical user interface may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
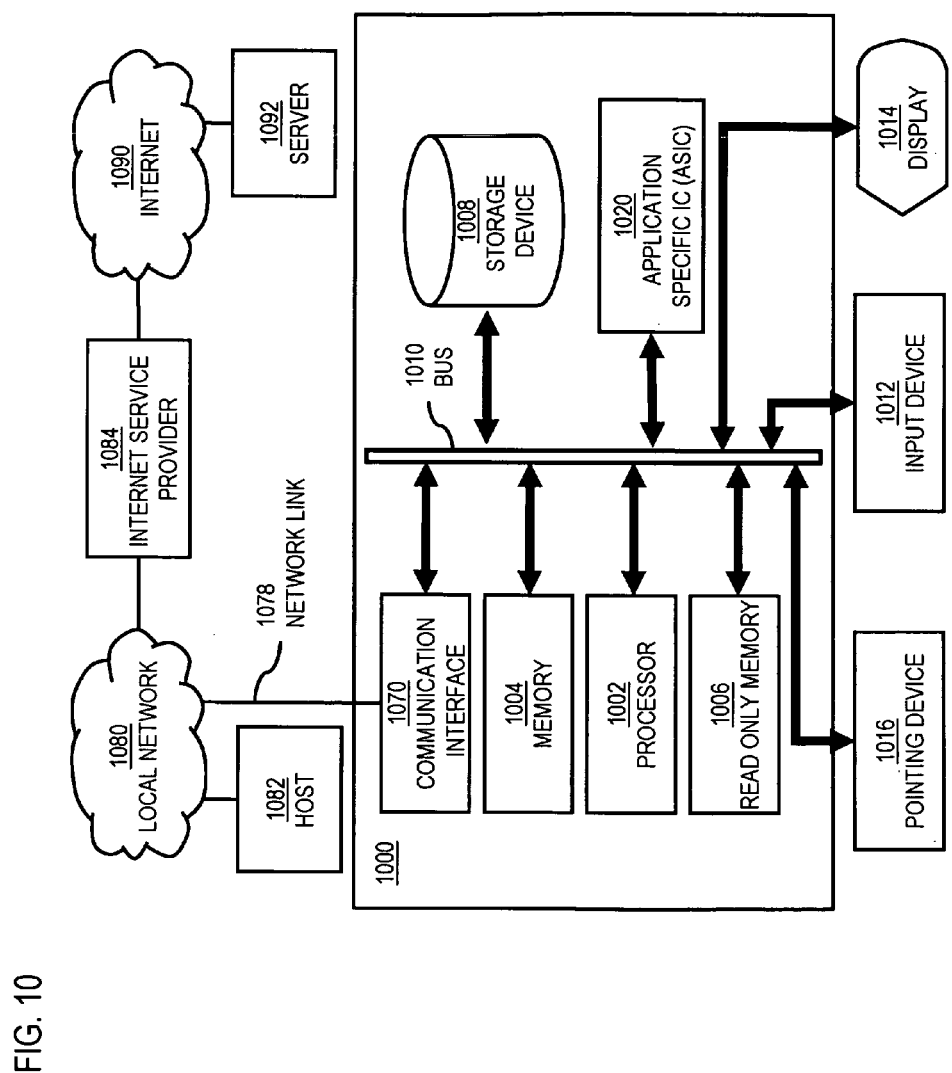
FIG. 10 is a diagram of hardware that can be used to implement an embodiment of the invention.

FIG. 10 illustrates a computer system 1000 upon which an embodiment of the invention may be implemented. Computer system 1000 is programmed (e.g., via computer program code or instructions) to provide a navigational graphical user interface as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to providing a navigational graphical user interface. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for providing a navigational graphical user interface. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for presenting a navigational graphical user interface, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 105 for offering navigational services to the UE 101.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Figure 11:
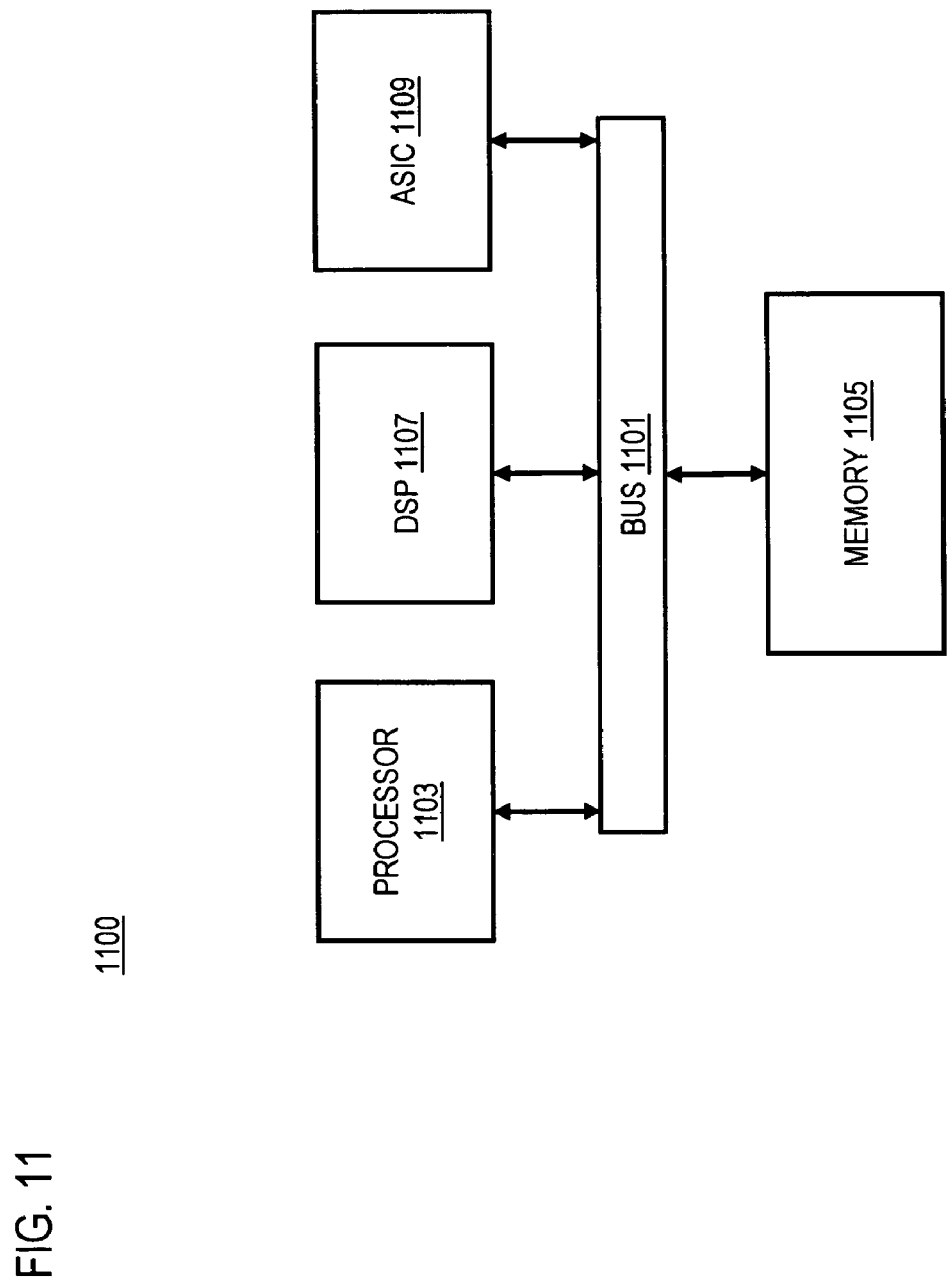
FIG. 11 is a diagram of a chip set that can be used to implement an embodiment of the invention.

FIG. 11 illustrates a chip set 1100 upon which an embodiment of the invention may be implemented. Chip set 1100 is programmed to provide a navigational graphical user interface as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide an improved navigational graphical user interface. The memory 1105 also stores the data associated with or generated by the execution of the inventive steps.

Figure 12:
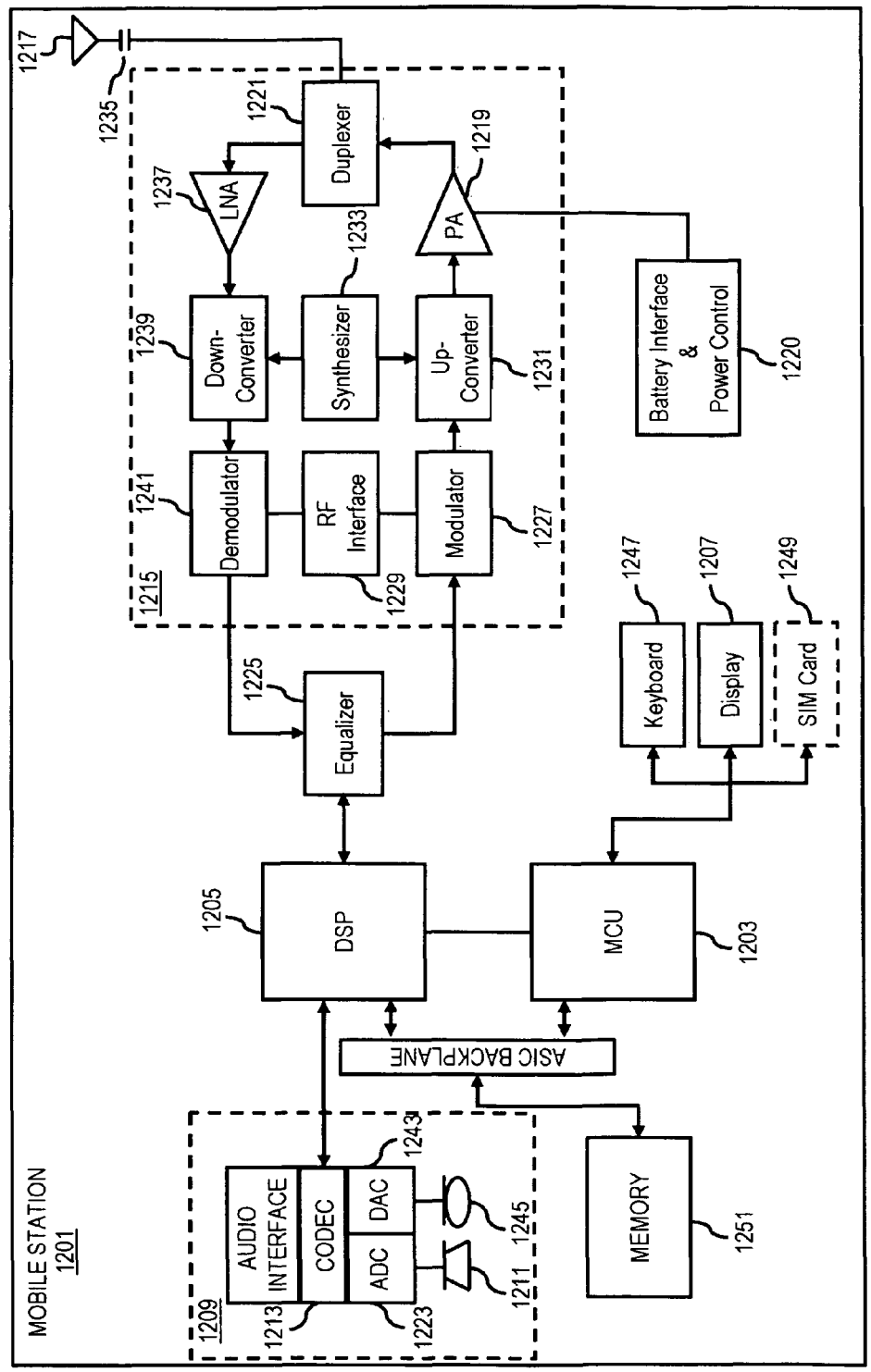
FIG. 12 is a diagram of a mobile station (e.g., handset) that can be used to implement an embodiment of the invention.

FIG. 12 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna

1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to provide navigational services. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    initiating presentation of a graphical user interface on a mobile device according to a navigational application, wherein the graphical user interface includes,
    a first area displaying one or more selectable objects,
    a second area displaying a map in perspective view that preserves a predetermined form, wherein the first area and the second area are non-overlapping.

2. The method of claim 1, wherein the predetermined form preserves scaling information, and the method further comprising:
    determining a position of the mobile device, wherein the position is displayed on the map.

3. The method of claim 1, wherein the mobile device includes either a cellular device, or an embedded vehicle device.

4. The method of claim 1, wherein one of the selectable objects initiates a modified image of the map.

5. The method of claim 1, wherein the one of the selectable objects is activated using a button, a touch screen, or a scroll and click mechanism.

6. The method of claim 5, wherein the one of the selectable objects relates to a point-of-interest or a waypoint.

7. The method of claim 6, further comprising: determining a route to the waypoint, wherein the route is displayed on the map.

8. An apparatus comprising:
at least one processor; and
at least one memory including computer program code,
the at least one memory and the computer program code configured to, with the at least one processor, cause the apparatus to perform at least the following,
initiate presentation of a graphical user interface on a mobile device according to a navigational application, wherein the graphical user interface includes,
a first area displaying one or more selectable objects,
a second area displaying a map in perspective view that preserves a predetermined form, wherein the first area and the second area are non-overlapping.

9. The apparatus of claim 8, wherein the predetermined form preserves scaling information, and the apparatus is further caused to:
determine a position of the mobile device, wherein the position is displayed on the map.

10. The apparatus of claim 8, wherein the mobile device includes either a cellular device, or an embedded vehicle device.

11. The apparatus of claim 8, wherein one of the selectable objects initiates a modified image of the map.

12. The apparatus of claim 8, wherein the one of the selectable objects is activated using a button, a touch screen, or a scroll and click mechanism.

13. The apparatus of claim 12, wherein the one of the selectable objects relates to a point-of-interest or a waypoint.

14. The apparatus of claim 13, wherein the apparatus is further caused to: determine a route to the waypoint, wherein the route is displayed on the map.

15. A non-transitory computer-readable storage medium carrying one or more sequences of one or more instructions which, when executed by one or more processors, cause an apparatus to perform at least the following:
initiate presentation of a graphical user interface on a mobile device according to a navigational application, wherein the graphical user interface includes,
a first area displaying one or more selectable objects,
a second area displaying a map in perspective view that preserves a predetermined form, wherein the first area and the second area are non-overlapping.

16. The non-transitory computer-readable storage medium of claim 15, wherein the predetermined form preserves scaling information, and the apparatus is further caused to:
determine a position of the mobile device, wherein the position is displayed on the map.

17. The non-transitory computer-readable storage medium of claim 15, wherein one of the selectable objects initiates a modified image of the map.

18. The non-transitory computer-readable storage medium of claim 15, wherein the one of the selectable objects is activated using a button, a touch screen, or a scroll and click mechanism.

19. The non-transitory computer-readable storage medium of claim 18, wherein one of the selectable objects relates to a point-of-interest or a waypoint.

20. The non-transitory computer-readable storage medium of claim 19, wherein the apparatus is further caused to determine a route to the waypoint, wherein the route is displayed on the map.

* * * * *